US008020020B2

United States Patent
Serebrin

(10) Patent No.: US 8,020,020 B2
(45) Date of Patent: Sep. 13, 2011

(54) FAST, AUTOMATICALLY SCALED PROCESSOR TIME STAMP COUNTER

(75) Inventor: Benjamin C. Serebrin, Mountain View, CA (US)

(73) Assignee: GLOBALFOUNDRIES Inc., Grand Cayman (KY)

(*) Notice: Subject to any disclaimer, the term of this patent is extended or adjusted under 35 U.S.C. 154(b) by 805 days.

(21) Appl. No.: 12/039,278

(22) Filed: Feb. 28, 2008

(65) Prior Publication Data

US 2009/0222684 A1    Sep. 3, 2009

(51) Int. Cl.
*G06F 1/12* (2006.01)
(52) U.S. Cl. .................. 713/375; 400/500; 400/501
(58) Field of Classification Search .......... 713/375, 713/400, 500, 501, 502, 503
See application file for complete search history.

(56) References Cited

U.S. PATENT DOCUMENTS

| | | | |
|---|---|---|---|
| 5,889,515 A * | 3/1999 | McDade et al. ............. 715/255 |
| 6,480,966 B1 | 11/2002 | Rawson, III | |
| 6,823,516 B1 * | 11/2004 | Cooper ....................... 718/108 |
| 7,058,838 B2 | 6/2006 | Xu | |
| 7,188,060 B1 * | 3/2007 | Adcock ........................... 703/14 |
| 2002/0087291 A1 * | 7/2002 | Cooper ........................ 702/186 |
| 2005/0058159 A1 | 3/2005 | Chapman | |

OTHER PUBLICATIONS

U.S. Appl. No. 12/039,140, filed Feb. 28, 2008.

* cited by examiner

*Primary Examiner* — Chun Cao
*Assistant Examiner* — Paul B Yanchus, III
(74) *Attorney, Agent, or Firm* — Lawrence J. Merkel; Meyertons, Hood, Kivlin, Kowert & Goetzel, P.C.

(57) ABSTRACT

In one embodiment, a processor comprises at least one processor time stamp counter (TSC) and a control unit coupled to the processor TSC. The processor TSC corresponds to a TSC that is defined to increment at a TSC clock frequency even though the processor is configurable to operate at one of a plurality of clock frequencies. The control unit is configured to maintain the processor TSC, and is configured to update the processor TSC when the processor is operating at a current clock frequency of the plurality of clock frequencies, wherein the update comprises adding a value to the processor TSC, and wherein the value is based on the ratio of the TSC clock frequency and the current clock frequency.

18 Claims, 7 Drawing Sheets

FAST, AUTOMATICALLY SCALED PROCESSOR TIME STAMP COUNTER

BACKGROUND

1. Field of the Invention

This invention is related to processors and, more particularly, to time stamp counters in processors.

2. Description of the Related Art

Processor instruction set architectures (ISAs) often specify a time stamp counter (TSC) to provide for the calculation of time in the computer system. Generally, the time stamp counter can be any architected resource that is defined to increment at some interval, so that time can be determined (or at least estimated) based on the value in the time stamp counter. For example, the x86 processor ISA (also referred to as the Intel Architecture (IA)-32 ISA, and includes various extensions such as the AMD-64 extensions defined by Advanced Micro Devices, Inc.) includes a TSC model specific register (MSR) that stores the TSC value. Instructions are provided to read and write the time stamp counter. Other instruction set architectures may define similar time measurement facilities (e.g. the PowerPC real time clock register).

In the case of the TSC MSR in the x86 processor ISA, the original definition of the TSC was to increment each processor clock cycle. With knowledge of the clock frequency of the processor, software could use the value in the TSC MSR to determine how much actual time had elapsed during an operation, keep track of the actual time for time/date purposes, etc. The actual time is also often referred to as "wall clock" time, to distinguish from time measured in clock cycle counts or other intervals. While this definition of the TSC MSR was useful when processor clock frequencies were constant for a given processor instance, the advent of aggressive power management techniques which vary the processor clock frequency made this definition unworkable because increments of the TSC MSR no longer represented equal amounts of time. Similarly, in a multiprocessor system (or multicore chip multiprocessors (CMPs)), the TSC in different processors could measure significantly different numbers of clock cycles if the processors were power-managed independently. Even if the processors were power-managed together, smaller differences in clock cycle measurements could occur as processors enter and leave various power states at slightly different times.

Accordingly, later versions of the processors implemented the TSC MSR in the north bridge used to bridge between the processor interface to the memory and various peripheral interfaces such as the peripheral component interconnect (PCI), the advanced graphics port (AGP), etc. Since the north bridge clock frequency is not normally varied, the TSC MSR being incremented at the north bridge clock frequency provides for more reliable time measurement. However, the latency to read the TSC MSR increases substantially.

SUMMARY

In one embodiment, a processor comprises at least one processor time stamp counter (TSC) and a control unit coupled to the processor TSC. The processor TSC corresponds to a TSC that is defined to increment at a TSC clock frequency even though the processor is configurable to operate at one of a plurality of clock frequencies. The control unit is configured to maintain the processor TSC, and is configured to update the processor TSC when the processor is operating at a current clock frequency of the plurality of clock frequencies, wherein the update comprises adding a value to the processor TSC, and wherein the value is based on the ratio of the TSC clock frequency and the current clock frequency.

In an embodiment, a method is contemplated in a processor comprising at least one processor time stamp counter (TSC) corresponding to a TSC that is defined to increment at a TSC clock frequency even though the processor is configurable to operate at one of a plurality of clock frequencies. The method comprises updating the processor TSC, wherein the processor is operating at the current clock frequency, and wherein the updating comprises adding a value to the processor TSC, and wherein the value is based on the ratio of the TSC clock frequency and the current clock frequency.

BRIEF DESCRIPTION OF THE DRAWINGS

The following detailed description makes reference to the accompanying drawings, which are now briefly described.

Figure 1:
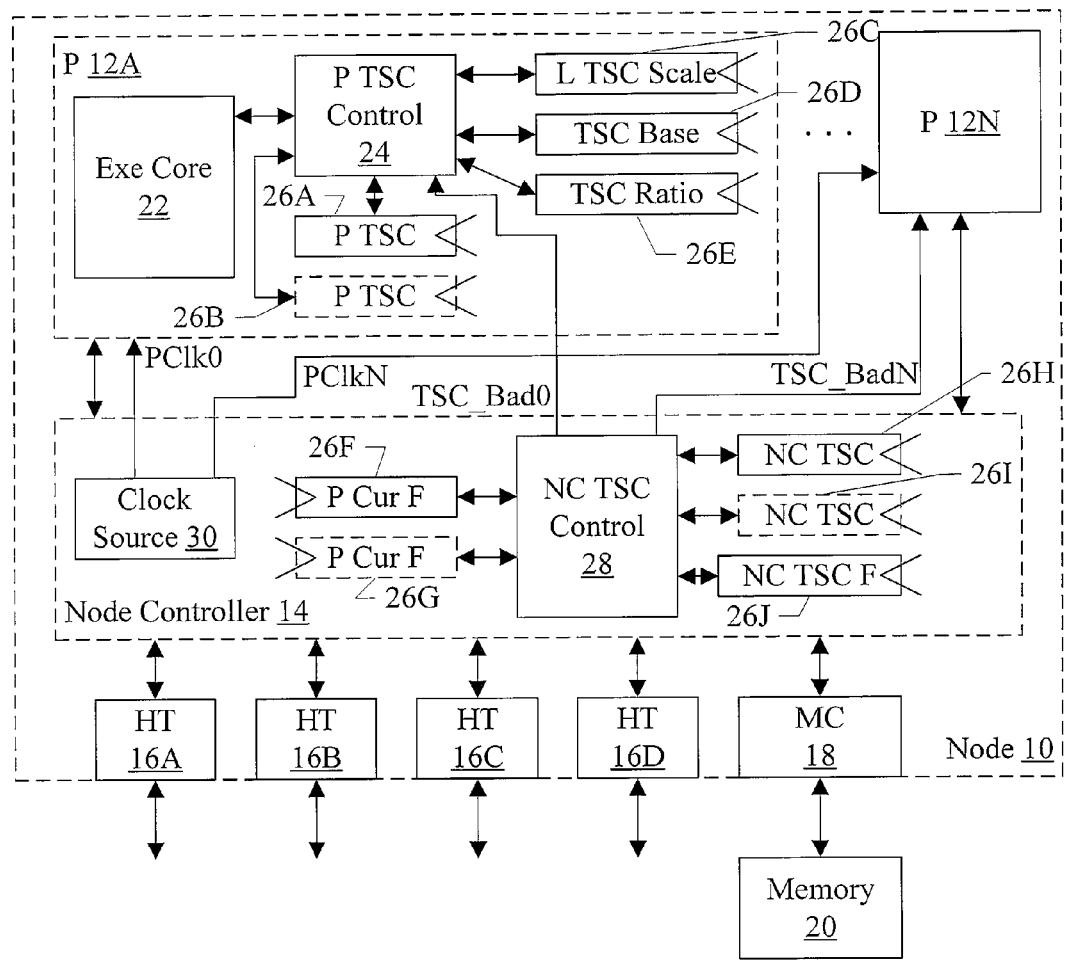
FIG. 1 is a block diagram of one embodiment of a node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In one embodiment, a processor implements a local TSC (referred to as the processor TSC, or P TSC, herein). Additionally, a controller that is coupled to the processor (and may be coupled to other processors, in a multiprocessor or chip multiprocessor (CMP) configuration) implements a TSC (referred to as the controller TSC). The controller TSC may be considered to be the master TSC in the system. That is, if the processor TSC or TSCs differ from the controller TSC, the controller TSC is considered to be the correct value. In one embodiment, one or both of the processor TSC and the controller TSC may be scaled to provide the TSC value supplied in response to a read TSC instruction. Accordingly, the values of the processor TSC and the controller TSC may not be directly compared. The scaled values may be comparable, however, and may generally be in synchronization with each other (e.g. approximately the same scaled value, within a small margin of error that may be, e.g., about one or two scale factors in size after accounting for delays in reading the controller TSC, if applicable) if no events have occurred that cause loss of synchronization.

In one embodiment, the controller may be configured to monitor operation of the processor and detect that the processor TSC is out of synchronization with the controller TSC. The controller may signal that processor to indicate that the processor TSC is out of synchronization (or "bad") in response to detecting the loss. If a read TSC instruction is executed by the processor, the result of the read TSC instruction is generated from the processor TSC if the controller has not signalled that the TSC is bad. That is, no resynchronization of the processor TSC may be performed in this case. If the controller has signalled that the processor TSC is bad, the processor may resynchronize the processor TSC to the controller TSC prior to generating the result. To the extent that read TSC instruction results may be generated from the processor TSC without resynchronization, the average latency of the read TSC instruction may be reduced compared to reading the TSC from the controller each time. However, an accurate TSC may be maintained as well.

In one embodiment, the controller may detect that the processor TSC has lost synchronization with the controller TSC if the processor clock frequency is changed. Other events may indicate loss of synchronization in other embodiments. For example, execution of a halt instruction in the processor (which causes the processor to stop operation) may indicate a loss of synchronization. Any events which cause (or should cause) the processor TSC to cease incrementing, or to increment at a different rate, or to increment by a different amount, may cause a loss of synchronization.

In one embodiment, the processor TSC may be incremented at the current processor clock frequency (and may be scaled to the TSC frequency) and the controller TSC may be incremented at the controller frequency (and may also be scaled to the TSC frequency, e.g. to resynchronize the processor TSC). In another embodiment, the processor TSC may be updated each clock cycle (or effectively updated each clock cycle) by an amount determined from the ratio of the TSC frequency and the current processor clock frequency. The amount may include an integer portion and a fractional portion, in general (although the fractional portion may be zero for some ratios). Various embodiments for incrementing by the fractional portion are described. In some such embodiments, the read TSC instruction may be executed with reduced latency because processor TSC need not be scaled to generate the result of the read TSC instruction, since the increment amount produces a processor TSC that is already scaled to the TSC frequency. Some embodiments may implement both the increment by the (possibly fractional) amount and the controller detection of the loss of synchronization described above. Additionally, some embodiments may implement a controller TSC that updates each controller clock cycle (or effectively updates each clock cycle) by an amount determined from the ratio of the TSC frequency and the controller clock frequency.

In one embodiment, the TSC frequency may be equal to the maximum processor clock frequency for the processor 10. In other embodiments, the TSC frequency may be a programmable ratio multiplied by the maximum clock frequency, or may be a fixed predetermined clock frequency.

In some embodiments, discrete processors and controllers may be implemented. For example, separate processor integrated circuits (ICs) and controller ICs may be used. An example embodiment may include one or more processor ICs and a north bridge as the controller IC. Other embodiments may include one or more processor cores and a controller integrated onto a single IC (e.g. a chip multiprocessor configuration). Thus, the term "processor" may generally refer to a discrete processor IC, or a processor core on a CMP. The term controller may refer to a discrete controller (e.g. a bridge such as the north bridge) or an on chip controller for a CMP.

Turning now to FIG. 1, a block diagram of one embodiment of a node 10 is shown. The node 10 comprises one or more processors 12A-12N coupled to a node controller 14. The node controller 14 is coupled to a plurality of HyperTransport™ (HT) interface circuits 16A-16D and a memory controller 18. The memory controller 18 is coupled to a memory 20, which may be external to the node 10 in this embodiment. The node 10 may be an integrated circuit comprising the components shown therein integrated onto a single semiconductor substrate. Other embodiments of the node 10 may be implemented as two or more discrete ICs and/or other components. Other embodiments may be implemented in other fashions, may have other interconnect, etc.

The processor 12A is shown in more detail in FIG. 1 for one embodiment, and other processors such as processor 12N may be similar. The processor 12A includes an execution core 22, a processor TSC control unit 24, and various storage devices 26A-26E. The storage devices 26A-26E may comprise registers, on-processor memory, and/or a combination thereof. The execution core 22 is coupled to the processor TSC control unit 24, which is further coupled to the storage devices 26A-26E. The processor TSC control unit 24 is further coupled to receive a TSC bad signal (TSC Bad0 in FIG. 1) from the node controller 14 (and more particularly from the node controller TSC control unit 28 in the node controller 14). The processor 12A is coupled to receive a processor clock (PClk0) from the node controller 14 (and more particularly a clock source 30 in the node controller 14). The processor 12N is similarly coupled to receive a processor clock (PClkN) and a TSC bad signal (TSC BadN) from the node controller 14.

One embodiment of the node controller 14 is shown in more detail in FIG. 1, and includes the node controller (NC) TSC control unit 28 and the clock source 30, as mentioned above, and further includes storage devices 26F-26J. The NC TSC control unit 28 is coupled to the storage devices 26F-26J.

As illustrated in FIG. 1, each processor 12A-12N may include at least one processor TSC (e.g. the processor TSC stored in the storage device 26A in FIG. 1). In some embodiments, more than one processor TSC may be included in each processor. For example, the processors 12A-12N may each be multithreaded processors, and there may be a processor TSC for each thread in each processor (e.g. an additional processor TSC is illustrated in the storage device 26B in FIG. 1). The processor TSC control unit 24 may maintain the processor TSC(s), updating them as described above (e.g. incrementing each processor clock cycle, updating by an amount determined from the TSC frequency to current processor frequency ratio, etc.).

The execution core 22 may execute a read TSC instruction, and may communicate with the processor TSC control unit 24 to read the processor TSC. In multithreaded versions, the execution core 22 may identify the corresponding thread so that the processor TSC control unit 24 may select the correct processor TSC. If the TSC bad signal from the node controller 14 has not been asserted since the most recent resynchronization to the controller TSC, the processor TSC control unit 24 may determine the result of the read TSC instruction based on the processor TSC and may return the result. In one embodiment, the TSC bad signal may be pulsed by the node controller 14, and the processor TSC control unit 24 may capture the pulse and store it until the next read TSC occurs. In other embodiments, the node controller 14 may assert the TSC bad signal and continue asserting the signal until the processor 12A reads the controller TSC. On the other hand, if the TSC bad signal has been asserted since the most recent resynchronization, the processor TSC control unit 24 may resynchronize the processor TSC to the controller TSC prior to generating the result for the read TSC instruction.

In one embodiment, the processor TSC control unit 24 is coupled to the storage devices 26C-26E to form the read TSC result. The local TSC scale in the storage device 26C may be the scale factor for the TSC, and may be the ratio of the TSC frequency to the current processor clock frequency. The TSC base may store a TSC base value, which may be read from the controller TSC and scaled to the TSC frequency. That is, the processor TSC may be set to zero during resynchronization, and the synchronized TSC from the node controller 14 (scaled to the TSC frequency) may be written to the TSC base. Accordingly, generating the read TSC instruction result may include scaling the processor TSC by the local TSC scale and adding the TSC base. Other offsets may be added as well. For example, in one embodiment, a virtual machine monitor may specify a TSC offset for a guest. The offset may be added to generate the read TSC result. Additionally, a TSC ratio may be stored that is the ratio of the TSC frequency to the maximum processor clock frequency at which the processor 12A may operate. The TSC ratio may be used in calculating various scale factors.

In one embodiment, the processor TSC control unit 24 may be implemented in hardware circuitry. In another embodiment, the processor TSC control unit 24 may be implemented in a combination of hardware circuitry and microcode executed by the execution core 22. For example, the updating of the TSC (e.g. incrementing, or adding a scaled value) may be performed by hardware circuitry, while the scaling of the processor TSC, the adding of the TSC base, and the adding of the other offsets may be performed in microcode. The detection of the TSC bad signal may also occur in hardware circuitry, in one embodiment, and when the microcode reads the processor TSC, the circuitry may signal that the TSC is bad so the microcode may resynchronize the processor TSC to the controller TSC. In other embodiments, the resynchronization may be performed by hardware circuitry. In one particular embodiment, the hardware circuitry may return a zero for a read of the processor TSC by the microcode if the processor TSC is bad, and the microcode may interpret the zero as a signal that the processor TSC is bad. A non-zero value may be treated as an indication that the processor TSC is good. Any division of the processor TSC control unit 24 into hardware circuitry and/or microcode may be made in various embodiments.

In embodiments in which there is more than one processor TSC, each processor TSC may be resynchronized separately, processor TSCs may be resynchronized in subsets, or all processor TSCs may be resynchronized concurrently. There may be one TSC bad signal, or there may be one per processor TSC, which may be deasserted when the corresponding processor TSC is resynchronized.

The NC control unit 28 may be configured to maintain one or more NC TSCs (e.g. the NC TSCs in the storage devices 26H and optionally 26I). There may be one NC TSC that is shared by the processors 12A-12N. Alternatively, there may be one NC TSC per processor, or there may be one NC TSC per thread on each processor (that is, if there are N processors and M threads per processor, there may be N*M NC TSCs). Alternatively, there may be one NC TSC and a per processor (or per thread and per processor) offset. Additionally, there may be an NC TSC frequency for scaling purposes. The NC TSC frequency may indicate the rate at which the NC TSC is updated. Additionally, the current frequency at which each processor is executing may be stored in the node controller 14 (P Cur F in storage devices 26F-26G, for example). If all processors are power managed together, so that the processors execute at the some processor clock frequency, there may be one current processor frequency. Alternatively, if the processors may be independently power managed, a current processor frequency may be maintained for each processor.

The NC TSC control unit 28 may also detect a change in the current processor frequency (e.g. by monitoring the current processor frequencies stored in the storage devices 26F-26G, or responsive to signals from the clock source 30). If a change in the processor clock frequency is detected, then the processor TSC on that processor is out of synchronization and the NC TSC control unit 28 may assert the TSC bad signal to that processor.

The clock source 30 may comprise any clock generation circuitry. For example, the clock source 30 may comprise one or more phase locked loops (PLLs) coupled to receive a reference clock frequency and configured to generate the processor clocks (e.g. PClk0 and PClkN in FIG. 1). The clock source 30 may also comprise other clock generation circuitry. In other embodiments, the clock source 30 may be local to the processors 12A-12N for the processor clocks. Each processor clock may be provided at one of a plurality of clock frequencies at which the processor is designed to operate. The selected processor clock frequency at any given point in time may depend, e.g., on the processor's power management state. That is, if more processing power is desired from the processor, the selected processor clock frequency may be a higher one of the plurality of clock frequencies. If less processing power is desired (e.g. the workload is less or the available battery power is low), a lower one of the plurality of clock frequencies may be selected. During operation, the selected clock frequencies may be changed as the power management state is changed.

In addition to the TSC operation described herein, the node controller 14 may have other operation. For example, the node controller 14 may generally communicate with the processors 12A-12N, the memory controller 18, and the HT interface circuits 16A-16D. A request received from any processor 12A-12N or an HT interface circuit 16A-16D may be processed by the node controller 14, which may route the request to the intended target or targets (which may include the processors 12A-12N, the interface circuits 16A-16D, and/or the memory controller 18). Responses from the processors 12A-12N, the interface circuits 16A-16D, and/or the memory controller 18 may also be received and routed by the node controller 14.

A given HT interface circuit 16A-16D may be used to couple to other nodes similar to the node 10 (optionally in a coherent fashion) or to one or more peripheral devices. The number of HT interface circuits may be varied in other embodiments. Other interfaces may be used in addition to, or instead of, the HT interfaces. The memory controller 18 may generally comprise queuing and memory interface hardware for the memory 20. The memory 20 may comprise memory modules of any type (e.g. single inline memory modules (SIMMs) or dual inline memory modules (DIMMs) of any memory technology, such as dynamic random access memory (DRAM), synchronous DRAM (SDRAM), double data rate SDRAM (DDR SDRAM), DDR2 SDRAM, DDR3 SDRAM, RAMBUS DRAM, etc.).

Generally, the execution core 22 is configured to execute the instructions defined in the instruction set architecture implemented by the processor 12A (e.g. the x86 instruction set architecture, including AMD64™ extensions, in some embodiments). The execution core 22 may employ any construction. For example, the execution core 22 may be a super-pipelined core, a superscalar core, or a combination thereof in various embodiments. Alternatively, the execution core 22 may be a scalar core, a pipelined core, a non-pipelined core, etc. The execution core 22 may employ out of order speculative execution or in order execution in various embodiments. The execution core 22 may include microcoding for one or more instructions or other functions, in combination with any of the above constructions.

Figure 2:
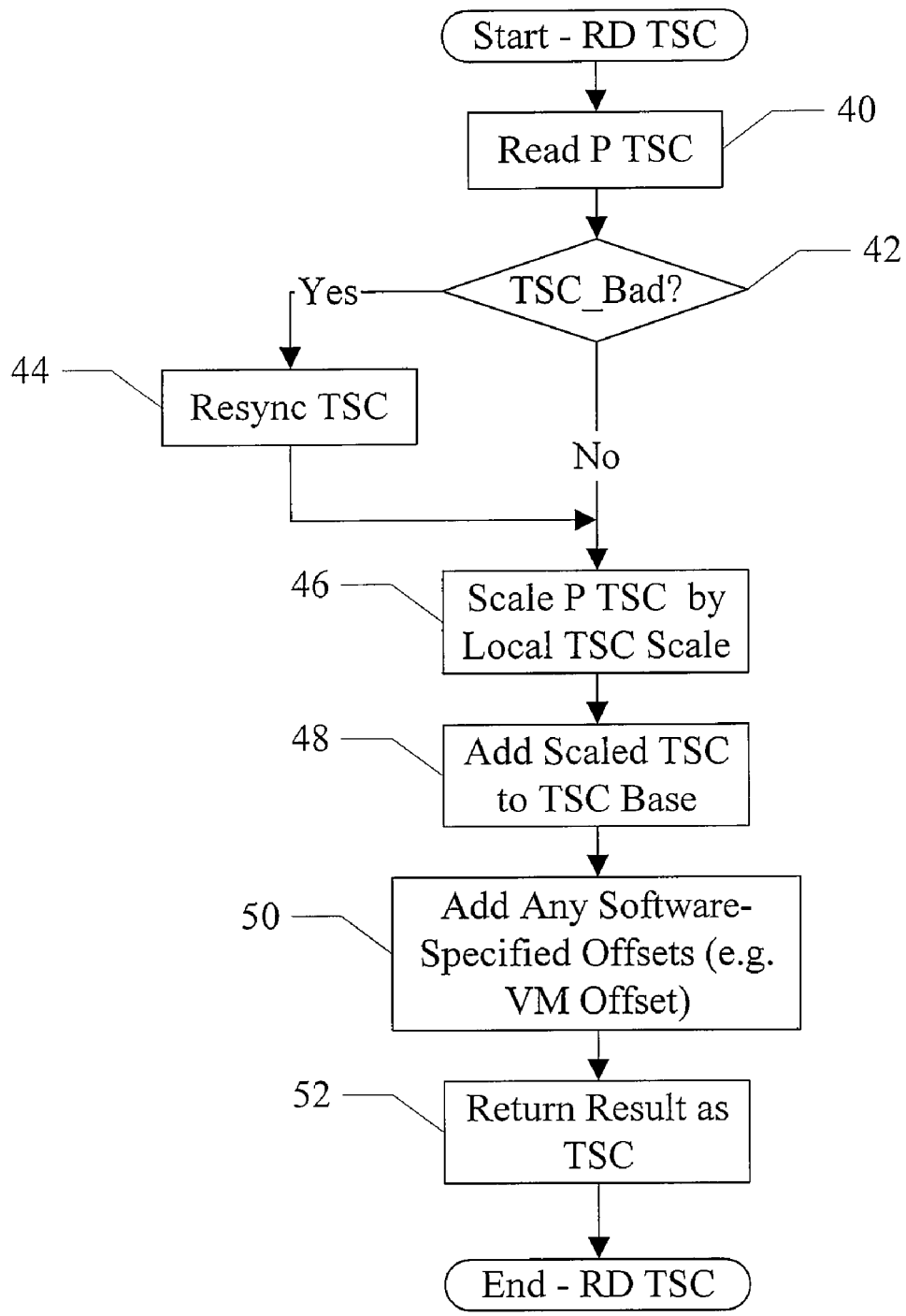
FIG. 2 is a flowchart of one embodiment of performing a read TSC instruction in a processor shown in FIG. 1.

Turning now to FIG. 2, a flowchart is shown illustrating operation of one embodiment of a processor 12A-12N (and more particularly the processor TSC control unit 24, in one embodiment) in response to a read TSC instruction. While the blocks are shown in a particular order for ease of understanding, other orders may be used. Blocks may be performed in parallel in combinatorial logic circuitry. Some blocks may be implemented in hardware circuitry, while others may be implemented in microcode. Alternatively, all blocks may be implemented in hardware circuitry, or all blocks may be implemented in microcode.

The processor may read the processor TSC (block 40). If the processor TSC is bad (decision block 42, "yes" leg), the processor may resynchronize the processor TSC to the controller TSC (block 44). If the processor TSC is not bad (decision block 42, "no" leg), or subsequent to the resynchronization if the processor TSC is bad, the processor may scale the TSC by the local TSC scale (block 46). That is, the processor TSC may be multiplied by the local TSC scale. The scaled TSC may be added to the TSC base (block 48). In some embodiments, one or more software-specified offsets may also be added (block 50). For example, a virtual machine offset specified by a virtual machine monitor for a guest that is executing the read TSC instruction may be added, if applicable. Other software-specified offsets may be specified in other embodiments. For example, a generic software-specified offset may be written to a model specific register (MSR), permitting any desired offset to be specified, and such an offset may be added. The result of blocks 46, 48, and 50 may be returned as the TSC result for the read TSC instruction (block 52).

In this embodiment, the TSC base is written when the processor TSC is resynchronized to the controller TSC. In other embodiments, the processor TSC may be updated directly and the TSC base may not be used.

In one embodiment, a write TSC instruction is also supported by the processors 12A-12N. Such an instruction may be implemented by writing the new TSC value to the TSC base, setting the processor TSC to zero, scaling the new TSC to the controller TSC frequency, and writing the scaled value to the controller TSC. In embodiments that do not implement the TSC base, the processor TSC may be updated directly, as well as updating the controller TSC as mentioned previously.

Figure 3:
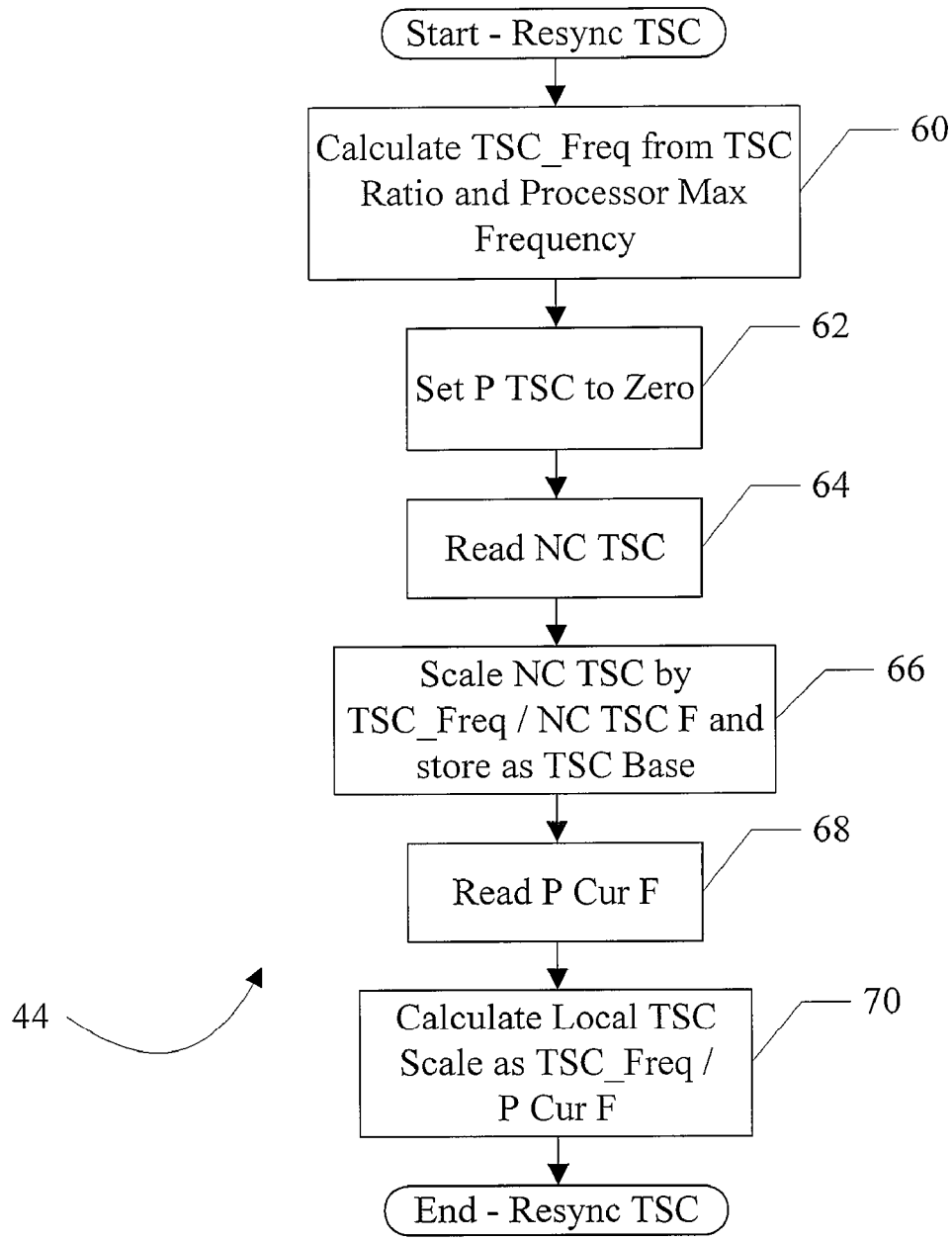
FIG. 3 is a flowchart of one embodiment of the processor synchronizing a processor TSC to a node controller TSC.

Turning now to FIG. 3, a flowchart is shown illustrating operation of one embodiment of a processor 12A-12N (and more particularly the processor TSC control unit 24, in one embodiment) to resynchronize the processor TSC to the controller TSC. For example, the flowchart of FIG. 3 may be implemented as block 44 in FIG. 2. There also may be other operations that cause a resynchronization of the TSC, and the operation of FIG. 3 may apply to those resynchronizations as well. For example, if the processor maximum frequency is changed or the TSC ratio is changed, a resynchronization may be performed. While the blocks are shown in a particular order for ease of understanding, other orders may be used. Blocks may be performed in parallel in combinatorial logic circuitry. Some blocks may be implemented in hardware circuitry, while others may be implemented in microcode. Alternatively, all blocks may be implemented in hardware circuitry, or all blocks may be implemented in microcode.

The processor may calculate the TSC frequency (TSC_Freq) from the TSC ratio and the maximum processor clock frequency (block 60). That is, the TSC frequency may be calculated by multiplying the TSC ratio and the maximum processor clock frequency. In other cases, the TSC frequency may be generated and stored (e.g. in a storage device 26). In other embodiments, the TSC frequency may be the maximum processor clock frequency, and block 60 may be eliminated.

In this embodiment, the TSC base is used and thus the processor TSC is set to zero (block 62). The processor may read the controller TSC from the node controller 14 (block 64), and may scale the controller TSC to the TSC frequency and may write the scaled controller TSC to the TSC base (block 66). The scale factor may be calculated as the ratio of the TSC frequency to the node controller TSC frequency (NC TSC F). The node controller TSC frequency may be read from the storage device 26J in the node controller 14, in one embodiment. The processor may also read the current processor frequency (P Cur F) (block 68). The processor may read the current processor frequency (e.g. from the node controller 14, in this embodiment), because the current processor frequency may be different from a requested processor frequency that the processor (or software executing on the processor) attempted to establish. The node controller 14 may calculate a new local TSC scale at the ratio of the TSC frequency to the processor current frequency (block 70).

Figure 4:
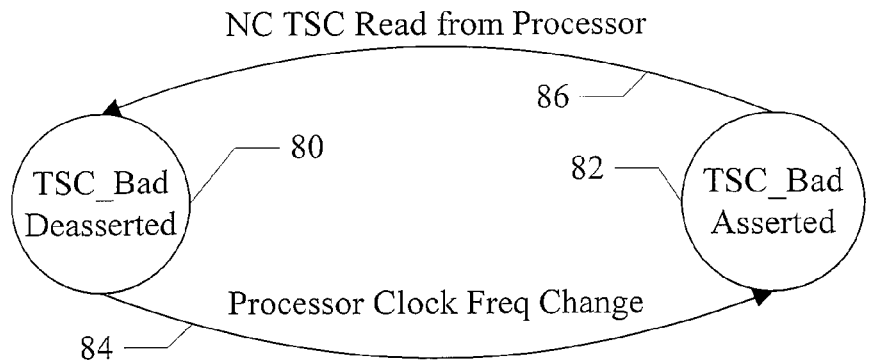
FIG. 4 is a state machine illustrating one embodiment of detecting and signalling loss of TSC synchronization.

Turning now to FIG. 4, a state machine is shown illustrating one embodiment of the assertion of the TSC bad signal to a processor. The state machine may be implemented, e.g., by the NC TSC control unit 28. Particularly, independent copies of the state machine may be implemented for each processor 12A-12N, in one embodiment. Independent copies of the state machine may be provided for each processor and each thread within the processor, in another embodiment.

The state machine includes a TSC_Bad deasserted state 80 and a TSC_Bad asserted state 82. In the TSC_Bad deasserted state 80, the NC TSC control unit 28 deasserts the TSC_Bad signal to the processor (indicating that the processor TSC has not lost synchronization with the controller TSC). In the TSC_Bad asserted state 82, the NC TSC control unit 28 asserts the TSC_Bad signal (indicating that the processor TSC has lost synchronization). In this embodiment, the TSC_Bad signal remains asserted until the processor reads the controller TSC to resynchronize the processor TSC. Accordingly, the state machine transitions from the TSC_Bad deasserted state 80 to the TSC_Bad asserted state 82 in response to detecting a clock frequency change (or other event that causes loss of synchronization—arrow 84). The state machine transitions from the TSC_Bad asserted state 82 to the TSC_Bad deasserted state 80 in response to a read of the NC TSC from the processor (arrow 86).

In other embodiments, the NC TSC control unit 28 may assert the TSC_Bad signal as a pulse. The pulse may occur when the loss of synchronization event is detected (e.g. arrow 84). The processor TSC control unit 24 may capture the pulse, and may determine that the synchronization is lost responsive to the captured pulse. The processor TSC control unit 24 may clear the captured pulse in response to resynchronizing the processor TSC, effectively making the transition illustrated by arrow 86.

Updating Processor TSC by Scaled Amounts

As mentioned above, in some embodiments, the processor TSC may be updated by a scaled amount instead of incrementing each processor clock cycle. Performing the scaled update may eliminate the multiplication by the local TSC scale (e.g. in FIG. 2, block 46), which may reduce the latency of the TSC reads by the multiplication latency, in some embodiments. FIGS. 5 to 8 and the description below illustrate several embodiments of how to perform the scaled update (which may include a fractional part and a whole number part, in general). In each case, the initialization (e.g. blocks 90, 110, 130, and 160) may be performed again if the TSC is indicated as bad. The processor TSC control unit 24 may automatically perform the initialization again if the TSC is bad, or the initialization may be performed as part of a resynchronization.

As mentioned previously, the controller TSC may also be updated by a scaled amount each node controller clock cycle. Embodiments similar to the embodiments of FIGS. 5 to 8 may be used, except that the node controller frequency may be used instead of the processor clock frequency.

Figure 5:
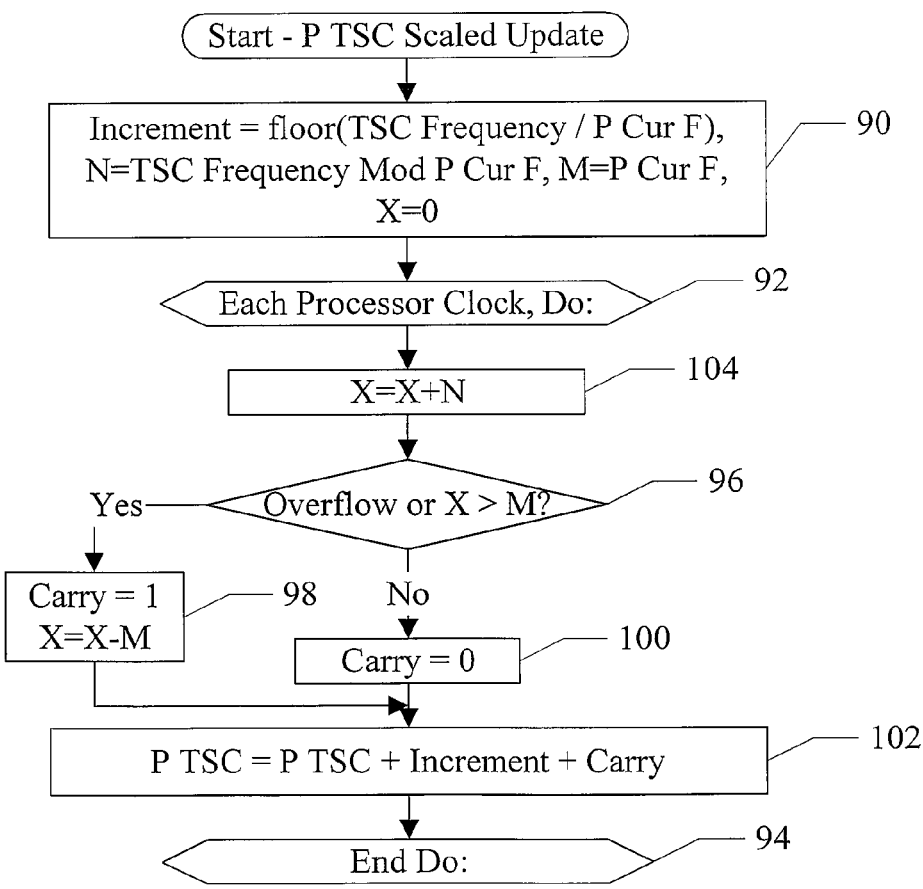
FIG. 5 is a flowchart illustrating one embodiment of maintaining a processor TSC so that scaling may not be needed when reading the processor TSC.

Turning now to FIG. 5, a flowchart is shown illustrating operation of one embodiment of the processor TSC control unit 24 to update the processor TSC by a scaled amount. While the blocks are shown in a particular order for ease of understanding, other orders may be used. Blocks may be performed in parallel in combinatorial logic circuitry. Some blocks may be implemented in hardware circuitry, while others may be implemented in microcode. Alternatively, all blocks may be implemented in hardware circuitry. Any Boolean equivalent or mathematically equivalent circuitry may be used.

The processor TSC control unit 24 may calculate an increment as the integer part of the TSC frequency divided by the current processor frequency (the floor of the division). The increment may be the amount by which the processor TSC is updated each processor clock cycle (block 90). Additionally, on some clock cycles, the update may include a carry out of a running sum of the fractional part of the update value, accumulated by the processor TSC control unit 24. For that calculation, the processor TSC control unit 24 may calculate N and M as shown in block 90. N and M are integers, and N is strictly less than M. N/M is the fractional part of the scaled update value. Thus, N is the modulus of the TSC frequency and the current processor frequency, and M is the current processor frequency. N and M may be expressed as integers according to a common base. For example, the base may be the minimum processor clock frequency, and each integer value may represent an increment of the processor clock frequencies between the plurality of processor clock frequencies that may be provided to the processor (e.g. at various power management levels). An exemplary increment may be 100 MHz, for example, between 1 GHz (the minimum processor clock frequency) and 6.3 GHz (the maximum processor clock frequency, in this example). Thus, the integers may range from 10 to 630, where 10 represents 1 GHz, 11 represents 1.1 GHZ, etc. to 630 representing 6.3 GHz. Other frequency ranges, minimum and maximum frequencies, and increments may be implemented in other embodiments. The running sum (X) may be initialized to zero.

Each processor clock cycle, the processor TSC control unit 24 may perform the operations between the start and end blocks of the "do" loop (blocks 92 and 94). The processor TSC control unit 24 may update the running sum, adding N (block 104). If the running sum overflows or becomes greater than M (decision block 96, "yes" leg), the processor TSC control unit 24 may generate the carry of one and may subtract M from the running sum (block 98). If the running sum does not overflow or become greater than M (decision block 96, "no" leg), the processor TSC control unit 24 may generate the carry of zero (block 100). In either case, the processor TSC control unit 24 may add the update value (increment and carry) to the current processor TSC to generate the updated processor TSC (block 102).

Figure 6:
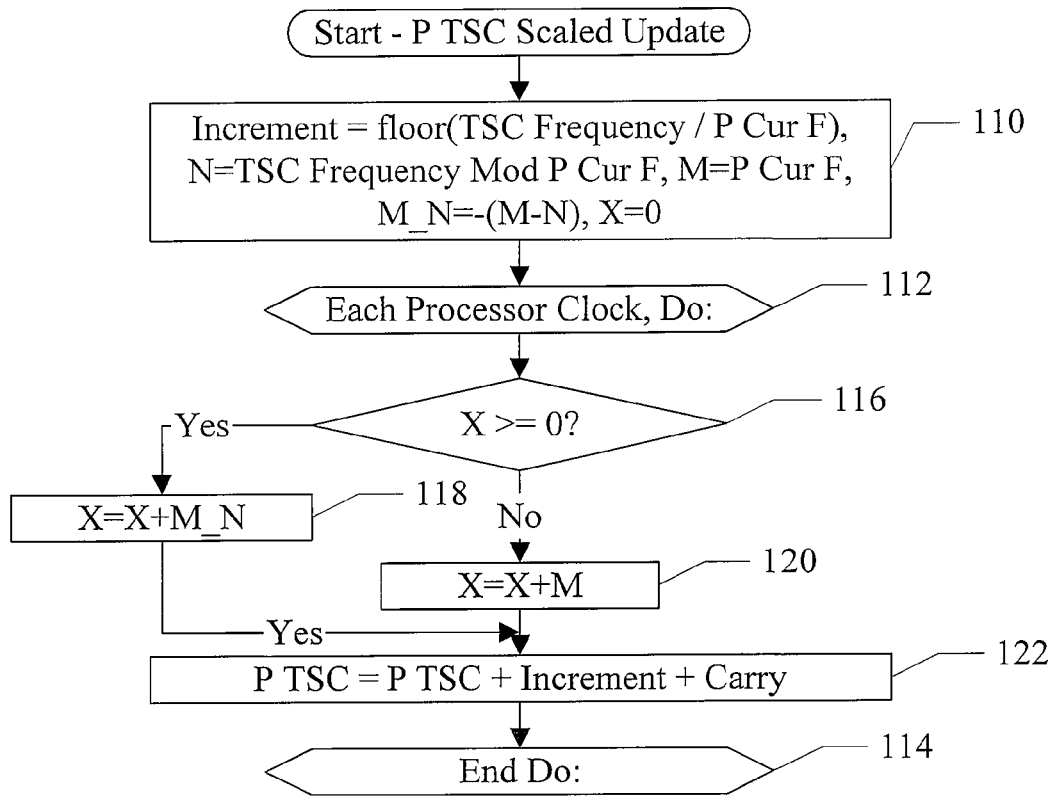
FIG. 6 is a flowchart illustrating another embodiment of maintaining a processor TSC so that scaling may not be needed when reading the processor TSC.

Turning now to FIG. 6, a flowchart is shown illustrating operation of another embodiment of the processor TSC control unit 24 to update the processor TSC by a scaled amount. While the blocks are shown in a particular order for ease of understanding, other orders may be used. Blocks may be performed in parallel in combinatorial logic circuitry. Some blocks may be implemented in hardware circuitry, while others may be implemented in microcode. Alternatively, all blocks may be implemented in hardware circuitry. Any Boolean equivalent or mathematically equivalent circuitry may be used.

The processor TSC control unit 24 may calculate the increment as the integer part of the TSC frequency divided by the current processor frequency (the floor of the division), N as the modulus of the TSC frequency and the current processor frequency, and M as the current processor frequency, similar to block 90 in FIG. 5 (block 110). Additionally, the processor TSC control unit 24 may calculate M_N as −(M−N) expressed in two's complement form.

Each processor clock cycle, the processor TSC control unit 24 may perform the operations between the start and end blocks of the "do" loop (blocks 112 and 114). If the running sum is greater than or equal to zero (decision block 116, "yes" leg), the processor TSC control unit 24 may add M_N to the running sum, effectively subtracting M−N from the running sum (block 118). Otherwise (decision block 116, "no" leg), the processor TSC control unit 24 may add M to the running sum (block 120). The carry from the running sum update (either adding M_N or M) may be the carry for the processor TSC update. The processor TSC may be updated by adding the increment and the carry to the current processor TSC (block 122).

The embodiment of FIG. 6 is mathematically equivalent to the embodiment of FIG. 5, but may be simpler to implement in hardware, in some embodiments.

Figure 7:
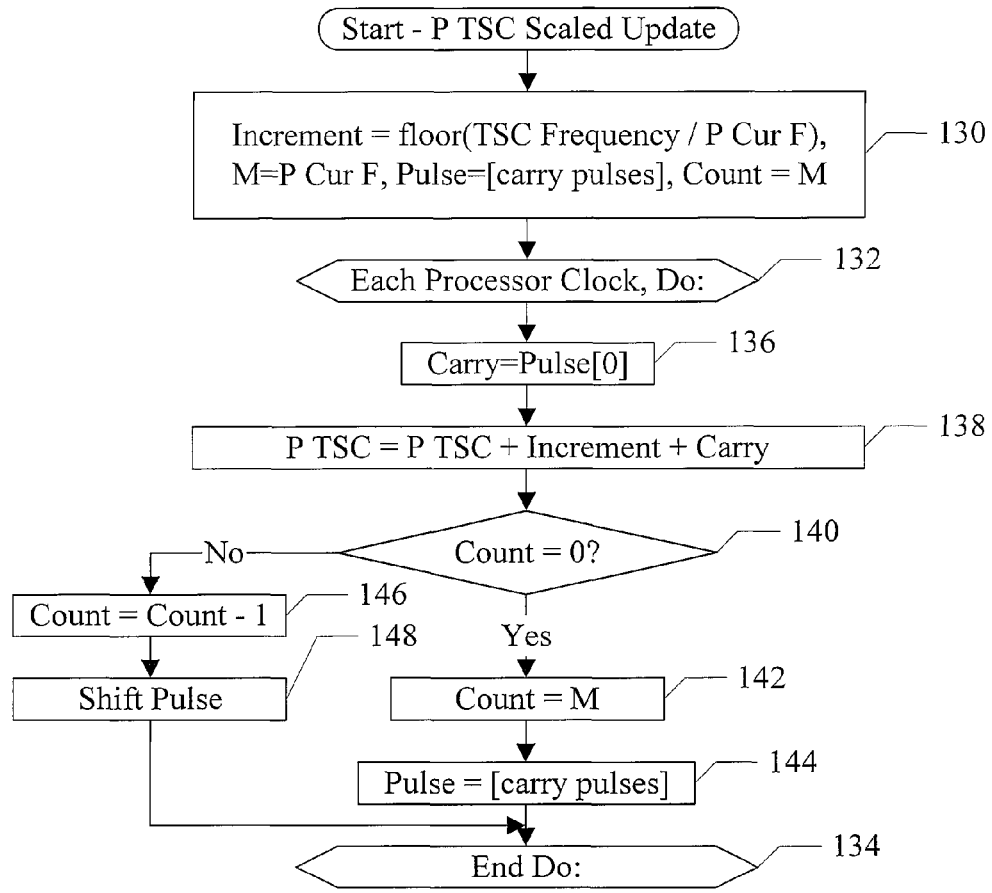
FIG. 7 is a flowchart illustrating yet another embodiment of maintaining a processor TSC so that scaling may not be needed when reading the processor TSC.

FIG. 7 is another flowchart illustrating operation of yet another embodiment of the processor TSC control unit 24 to update the processor TSC by a scaled amount. While the blocks are shown in a particular order for ease of understanding, other orders may be used. Blocks may be performed in parallel in combinatorial logic circuitry. Some blocks may be implemented in hardware circuitry, while others may be implemented in microcode. Alternatively, all blocks may be implemented in hardware circuitry. Any Boolean equivalent or mathematically equivalent circuitry may be used.

The embodiment of FIG. 7 treats the carries as a stream of pulses. For a given fraction, the carry will be generated (starting from a running sum of zero) at predictable times. The pulse stream may be precalculated, and has a period no greater than M (although the stream may be shorter and repeat). The pulse stream may be precalculated (e.g. by software or microcode) and stored (e.g. as Pulse in block 130). A counter (Count may be initialized to M), and the increment and M may be initialized as described in block 90.

Each processor clock cycle, the processor TSC control unit 24 may perform the operations between the start and end blocks of the "do" loop (blocks 132 and 134). The carry may be selected as the bit of the pulse stream (e.g. bit 0 in this embodiment—block 136). The processor TSC may be updated by adding the increment and the carry to the current processor TSC (block 138). If the counter has reached 0 (decision block 140, "yes" leg), the pulse stream has reached its end and thus the counter is reset to M and the pulse is reset to the original pulse stream (blocks 142 and 144). If the counter has not reached zero, the counter may be decremented and the pulse stream may be shifted to select the next pulse (blocks 146 and 148).

Figure 8:
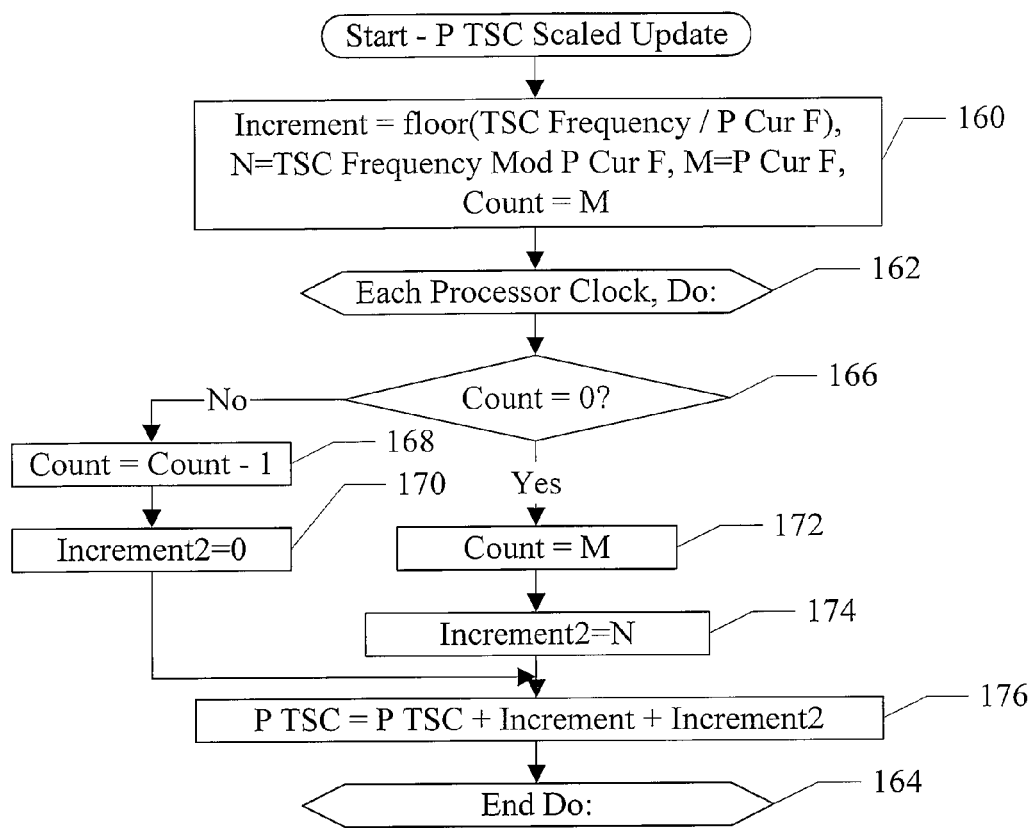
FIG. 8 is a flowchart illustrating still another embodiment of maintaining a processor TSC so that scaling may not be needed when reading the processor TSC.

FIG. 8 is a flowchart illustrating operation of still another embodiment of the processor TSC control unit 24 to update the processor TSC by a scaled amount. While the blocks are shown in a particular order for ease of understanding, other orders may be used. Blocks may be performed in parallel in combinatorial logic circuitry. Some blocks may be implemented in hardware circuitry, while others may be implemented in microcode. Alternatively, all blocks may be implemented in hardware circuitry. Any Boolean equivalent or mathematically equivalent circuitry may be used.

The embodiment of FIG. 8 uses the recognition that adding N/M each clock cycle is the same as adding N every M clock cycles. While this embodiment produces periodic "jumps" of N in the processor TSC, the jumps may be acceptable. For this embodiment, the increment, M, and N are determined similar to block 90, and a counter (Count) is initialized to M (block 160).

Each processor clock cycle, the processor TSC control unit 24 may perform the operations between the start and end blocks of the "do" loop (blocks 162 and 164). If the counter is not zero (decision block 166, "no" leg), the counter is decremented and "increment2" is set to zero (blocks 168 and 170). If the counter is zero, the counter is reset to M and increment2 is set to N (blocks 172 and 174). The processor TSC may be updated by adding the increment and the increment2 to the current processor TSC (block 176).

In still another embodiment, the fraction part may be approximated to Y bits, where Y is an integer that provides acceptable error, and the processor TSC may be expanded by Y bits. In such a case, the running sum is kept in the Y extra bits of the processor TSC and the carry is automatically added by adding the integer part concatenated with the Y bit approximation of the fractional part to the processor TSC (including the Y extra bits).

Numerous variations and modifications will become apparent to those skilled in the art once the above disclosure is fully appreciated. It is intended that the following claims be interpreted to embrace all such variations and modifications.

What is claimed is:

1. A processor comprising:
   at least one processor time stamp counter (TSC) corresponding to a TSC that is defined to increment at a TSC clock frequency even though the processor is configurable to operate at one of a plurality of clock frequencies;
   a control unit coupled to the at least one processor TSC and configured to maintain the processor TSC, wherein the control unit is configured to update the processor TSC, wherein the processor is operating at a current clock frequency of the plurality of clock frequencies, and wherein the update comprises adding a value to the processor TSC, wherein the value is based on the ratio of the TSC clock frequency and the current clock frequency, and wherein the ratio comprises an integer portion and a fractional portion, and wherein the value comprises the integer portion and a carry from a running sum corresponding to the fractional portion.

2. The processor as recited in claim 1 wherein the fractional portion is represented by two integers N and M, wherein N is the numerator of the fractional portion and is equal to the TSC clock frequency modulo the current clock frequency expressed in a common base, and wherein M is the denominator and is equal to the current clock frequency expressed in the common base, and wherein the control unit is configured to update the running sum by adding N to a current value of the running sum, and wherein the carry is detected if the addition overflows or if the updated running sum is greater than M.

3. The processor as recited in claim 2 wherein the control unit is further configured to subtract M from the updated running sum if the addition overflows or if the updated running sum is greater than M.

4. The processor as recited in claim 1 wherein the fractional portion is represented by two integers N and M, wherein N is the numerator of the fractional portion and is equal to the TSC clock frequency modulo the current clock frequency expressed in a common base, and wherein M is the denominator and is equal to the current clock frequency expressed in the common base, and wherein the control unit is configured to update the running sum by determining that the running sum is greater than or equal to zero, subtracting (M−N) from the running sum, and using the carry of the subtraction as the carry for the running sum.

5. The processor as recited in claim 4 wherein the control unit is configured to update the running sum by determining that the running sum is less than zero, adding M to the running sum, and using the carry of the addition as the carry for the running sum.

6. The processor as recited in claim 1 wherein the control unit is configured to use a precomputed sequence of the carries for the running sum instead of computing the running sum.

7. The processor as recited in claim 6 wherein the control unit is configured to reset to the beginning of the sequence after a number of carries corresponding to the current clock frequency expressed in a defined base frequency have been used.

8. The processor as recited in claim 1 wherein the control unit is configured to approximate the fractional portion to within a preselected number of bits, and wherein the processor TSC comprises a number of bits specified for the TSC plus the preselected number of bits, and wherein a correct processor TSC is approximated by adding the integer portion of the ratio concatenated with the approximation the fractional portion to the processor TSC each clock cycle.

9. The processor as recited in claim 1 wherein the TSC frequency is a maximum one of the plurality of clock frequencies.

10. The processor as recited in claim 1 wherein the TSC frequency is a programmable ratio multiplied by a maximum one of the plurality of clock frequencies.

11. In a processor comprising at least one processor time stamp counter (TSC) corresponding to a TSC that is defined to increment at a TSC clock frequency even though the processor is configurable to operate at one of a plurality of clock frequencies, a method comprising:
   updating the processor TSC, wherein the processor is operating at the current clock frequency, wherein the updating comprises adding a value to the processor TSC, wherein the value is based on the ratio of the TSC clock frequency and the current clock frequency, and wherein the ratio comprises an integer portion and a fractional portion, and wherein the value comprises the integer portion and a carry from a running sum corresponding to the fractional portion.

12. The method as recited in claim 11 wherein the fractional portion is represented by two integers N and M, wherein N is the numerator of the fractional portion and is equal to the TSC clock frequency modulo the current clock frequency expressed in a common base, and wherein M is the denominator and is equal to the current clock frequency expressed in the common base, and wherein updating the processor TSC further comprises:
- generating the running sum by adding N to a current value of the running sum; and
- detecting the carry responsive to the addition overflowing or the updated running sum being greater than M.

13. The method as recited in claim 12 the updating further comprises subtracting M from the updated running sum responsive to the addition overflowing or the updated running sum being greater than M.

14. The method as recited in claim 11 wherein the fractional portion is represented by two integers N and M, wherein N is the numerator of the fractional portion and is equal to the TSC clock frequency modulo the current clock frequency expressed in a common base, and wherein M is the denominator and is equal to the current clock frequency expressed in the common base, and wherein updating the processor TSC further comprises updating the running sum by:
- determining that the running sum is greater than or equal to zero;
- subtracting (M−N) from the running sum responsive to determining that the running sum is greater than or equal to zero; and
- using the carry of the subtraction as the carry for the running sum.

15. The method as recited in claim 11 wherein the fractional portion is represented by two integers N and M, wherein N is the numerator of the fractional portion and is equal to the TSC clock frequency modulo the current clock frequency expressed in a common base, and wherein M is the denominator and is equal to the current clock frequency expressed in the common base, and wherein updating the processor TSC further comprises updating the running sum by:
- determining that the running sum is less than zero;
- adding M to the running sum responsive to determining that the running sum is less than zero; and
- using the carry of the addition as the carry for the running sum.

16. The method as recited in claim 11 further comprising using a precomputed sequence of the carries for the running sum instead of computing the running sum.

17. The method as recited in claim 16 further comprising resetting to the beginning of the sequence after a number of carries corresponding to the current clock frequency expressed in a defined base frequency have been used.

18. The method as recited in claim 11 further comprising:
- approximating the fractional portion to within a preselected number of bits, wherein the processor TSC comprises a number of bits specified for the TSC plus the preselected number of bit; and
- approximating a correct processor TSC by adding the integer portion of the ratio concatenated with the approximation the fractional portion to the processor TSC each clock cycle.

* * * * *